United States Patent [19]

Larom et al.

[11] Patent Number: 4,559,912
[45] Date of Patent: Dec. 24, 1985

[54] SPEED LIMITING DEVICE OF ENGINE AND/OR VEHICLE

[75] Inventors: Dov Larom, Tel-Aviv; Gabriel Shahar, Ramat-Gan, both of Israel

[73] Assignee: Ellar B.M., Tel-Aviv, Israel

[21] Appl. No.: 443,832

[22] Filed: Nov. 22, 1982

[30] Foreign Application Priority Data

Nov. 22, 1981 [IL] Israel .................................. 64333

[51] Int. Cl.⁴ .......................................... F02D 31/00
[52] U.S. Cl. .................................. 123/350; 123/361; 123/396; 180/179
[58] Field of Search ............... 123/350, 351, 352, 361, 123/396, 399, 400; 180/178, 179, 335

[56] References Cited

U.S. PATENT DOCUMENTS

| | | | |
|---|---|---|---|
| 3,164,220 | 1/1965 | Würgler | 180/178 |
| 3,520,380 | 7/1970 | Radin et al. | 123/351 |
| 3,807,372 | 4/1974 | Garcea | 123/413 |
| 3,878,915 | 4/1975 | Purland et al. | 123/350 |
| 4,086,888 | 5/1978 | Roberts | 123/352 |
| 4,099,592 | 7/1978 | Gonzales | 123/352 |
| 4,107,962 | 8/1978 | MacKinnon | 307/10 AT |
| 4,181,103 | 1/1980 | Sturdy | 123/352 |
| 4,236,142 | 11/1980 | Lindsey | 307/10 AT |
| 4,380,799 | 4/1983 | Allard et al. | 123/396 |

FOREIGN PATENT DOCUMENTS

| | | | |
|---|---|---|---|
| 2419835 | 11/1979 | France | 180/179 |
| 2441509 | 7/1980 | France | 180/179 |
| 2451286 | 11/1980 | France | 123/361 |

*Primary Examiner*—Andrew M. Dolinar
*Attorney, Agent, or Firm*—Sughrue, Mion, Zinn, Macpeak & Seas

[57] ABSTRACT

The present invention relates to a device ascertaining that a vehicle does not exceed a pre-set speed limit and/or a pre-set engine RPM limit. Said device comprises means for transferring the input movement from the accelerator to means for contacting the output movement; means for transferring said output movement to the speed control unit; electrical means actuating said control means at the proper time, means for reading the speed and/or the engine RPM and means for pre-setting the desired speed limit and/or engine RPM limit. Said device may comprise additional means for protecting the vehicle to be driven by unauthorized persons. The device may be utilized for any vehicle and/or machine which is actuated by a lever and the drawing distance together with the load determine the speed, e.g., cars, airplanes, tractors and other agricultural implements.

3 Claims, 15 Drawing Figures

SPEED LIMITING DEVICE OF ENGINE AND/OR VEHICLE

The present invention relates to a device which ascertains that a vehicle (as herein defined) does not exceed a pre-set speed limit and/or a pre-set limit of the number of rotations of the engine (RPM). (The invention will be illustrated herein mainly with reference to the speed. However, as indicated above it may be utilized also for the control of the engine RPM).

A vehicle in connection with the present invention comprises any vehicle and/or machine which is actuated by a lever and the drawing distance together with the load determine the speed. The invention will be illustrated herein with reference to a car but it is not limited thereto. It may be utilized also for, e.g., airplanes, tractors, other agricultural implements, etc.

There are known systems which enable the driver to drive at a pre-set speed. Such known systems are for example, of the so-called "cruising types". Said systems regulate, after manual activation, the speed of travelling by operating independently even though the accelerator has been released.

The drawbacks of such a cruising system are apparent; while it might perform satisfactorily on long and thinly occupied highways, it imposes a burden on the driver whenever slow-downs or full-stops are required. Any stepping on the brakes causes the deactivation of the system and manual reactivation is required. Frequent annoying reactivation cause most drivers to discard the system altogether or use it only during long highway rides.

Moreover, a cruising system may be the cause of a hazardous situation to it's user; during the course of driving, a normal safe-driving procedure is the passive slow-down achieved by releasing the accelerator in case of a remote but approaching dangerous situation. The unnatural procedure of achieving this slow-down when a cruising system is operative involves deactivating the system and reactivating it if the danger is passed. Frequently drivers delay this procedure and exercise it only when the danger is more apparent, thus lowering the margin of safety.

As becomes apparent said system enables the driving of the car at a pre-set speed. However, the moment the system is deactivated the driver can drive at any speed and has certainly no automatic control over a speed limit.

As is known, in most countries there are rigorous speed limits for driving vehicles and heavy penalties are imposed on those drivers exceeding said speed limits.

Moreover, in the commercially available vehicles it is not possible to ascertain that the driver always drives in the gear corresponding to the desired speed. This could be controlled by limiting the allowed engine RPM.

It has thus been desirable to construct a device which ascertains that the driver does not exceed the pre-set speed limit and/or a pre-set engine RPM limit. The driver should be able to set said speed limit easily. However, once said limit has been fixed the device should not be deactivated as is the case, for example, in the cruising type system. Such a device should be usable in existing cars, not be complicated, be easily mountable and not too expensive.

The present invention thus consists in a device ascertaining that a vehicle (as herein defined) does not exceed a pre-set speed limit and/or a pre-set engine RPM limit comprising:

a. means for transferring the input movement from the accelerator to
b. means for controlling the output movement;
c. means for transferring said output movement to the speed control unit;
d. electrical means actuating said control means the moment the pre-set speed limit and/or the pre-set engine RPM limit is reached;
e. means for reading the speed and/or the engine RPM;
f. means for pre-setting the desired speed limit and/or the pre-set engine RPM limit.

Speed control units in connection with the present invention are for example, carburettors, certain injection systems, electrical engines, etc.

The device according to the present invention may be varied to a very large extent. However, as long as all the above features are present the device will be within the scope of the present invention.

The means for transferring the input movement from the accelerator (hereinafter "transfer means I") and the means for transferring the output movement (hereinafter "transfer means II") may be any suitable connection means, being connected in such a manner that they can partly be drawn. Thus, for example, the cable connecting in conventional cars the accelerator to the carburettor may be replaced by two cables, one being secured to the accelerator at the one end and to some movable means, e.g., a pulley, a movable carriage, etc. on the other end, and the second to the speed control unit on the end and to the above-mentioned movable means on the other end. However, any other suitable connection means may be considered.

Means for controlling said output movements is an actuator, e.g., a piston, a motor, etc., actuating means ascertaining the desired ratio between transfer means I and transfer means II. Said actuating means may be a movable carriage, a pulley, etc. Said actuator when receiving the proper signal actuates via the actuating means transfer means II in such a manner that the speed control unit is regulated to ascertain that the speed limit is not exceeded.

The electrical actuating means may be, for example, any suitable electrical circuit which when the references e.g. voltage indicates, e.g., when said reference voltage is exceeded, actuates the control means, e.g., the motor. Means for reading the speed and/or the engine RPM may be any suitable means converting the linear and/or angular speed into voltage.

The means for pre-setting the speed limit and/or the engine RPM limit is, e.g., a potentiometer, a selector, a keyboard, etc. Said means can be set by the driver, for example, by a calibrated knob set at the front panel, keyboard push buttons, etc. and serve then as the reference for the above electrical circuit. The moment it is desired said speed limit may easily be changed by turning said knob, pressing proper button(s), etc.

Said reference may be adjusted to zero with the aid of certain additional means, e.g., a secret switch (when a potentiometer or selector is used) or a code (when a keyboard is used). Thus, the car cannot be driven unless the driver can open the secret switch or knows the correct code.

The moment the device according to the present invention should serve simultaneously as a device for ascertaining that both the pre-set speed limit and the pre-set engine RPM limit should not be exceeded the device according to the present invention should comprise two reading and two presetting limitation means.

The device according to the present invention overcomes the above drawbacks. It is readily understood that the main functional difference between the device according to the present invention and the above cruising type ones is as follows:

the cruising type systems force the vehicle to travel at a fixed speed, the new device allows the vehicle to travel at any speed up to the preset speed limit, but not above it.

Once the device according to the present invention is installed, it stays operative without any attention from the driver. The engagement of the device's action into the driving mechanism is performed in such a way as to keep the driving action in a natural and conventional way. So long as the preset speed limit is not reached, any stepping on or releasing of the accelerator is transferred directly to the carburettor, thus maintaining normal driving procedures. However, if the accelerator has been depressed to such an extent which would normally cause the vehicle to accelerate to a speed greater than the speed limit the device would interfere at the limited speed required and maintain that speed. As long as the accelerator is over-depressed the device will cause the vehicle to drive at the preset speed limit.

Releasing the accelerator slowly would have no effect on the driving speed of the vehicle down to the point where the vehicle would have the preset speed limit by itself, had the control system not been installed; from this point on, the vehicle would slow down without any intervening of the device. If, according to the above described conditions, the device regulates the speed and the driver releases the accelerator instantly the carburettor would be shut off immediately with the device causing no delay at all.

Moreover, an important feature of the device according to the present invention is the ability of organizations owning a fleet of vehicles to impose on their drivers the legal speed limit by installing systems with a front panel knob having a maximum dial reading in accordance with the speed limit in their country.

It is readily understood that by proper adjustment of the pre-setting means one ascertains that the driver drives in the gear corresponding to the speed.

It is readily understood that the device according to the present invention can be easily mounted on any vehicle. It does not require much space; its mounting is neither complicated nor time consuming.

The present invention will now be illustrated with reference to the accompanying drawings without being limited by them. (Similar parts are referenced by the same numerals; the indication to pre-set speed limit comprises pre-set engine RPM limit). In said drawings:

FIG. 2 shows on an enlarged scale schematically the top view shown in FIG. 1a;

FIG. 3 shows on an enlarged scale schematically the top view of a variation of the embodiment shown in FIG. 1a;

Figure 1:
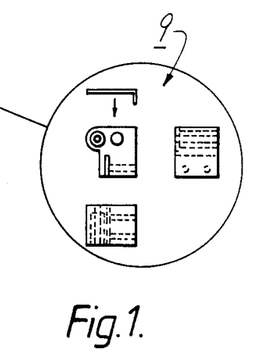
FIG. 1 and FIGS. 1a, 1b and 1c respectively show top, side and front views of the mechanical arrangement of a device according to the present invention.
Figure 1A:
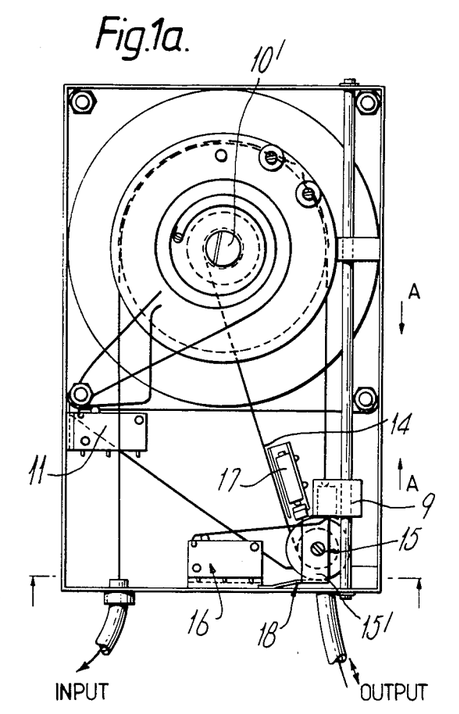
Figure 1B:
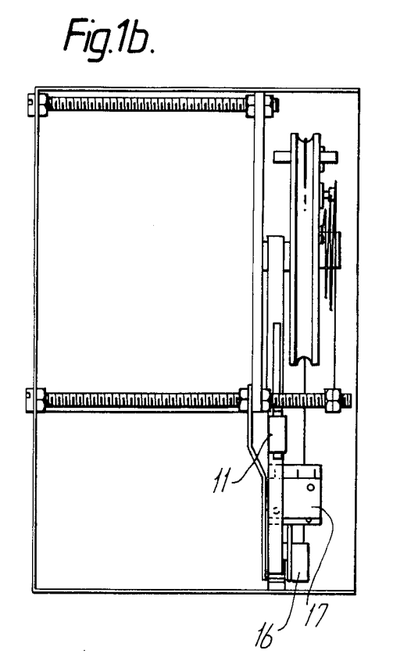
Figure 1C:
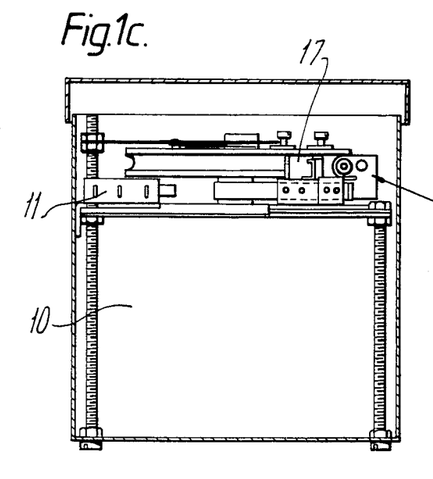
Figure 2:
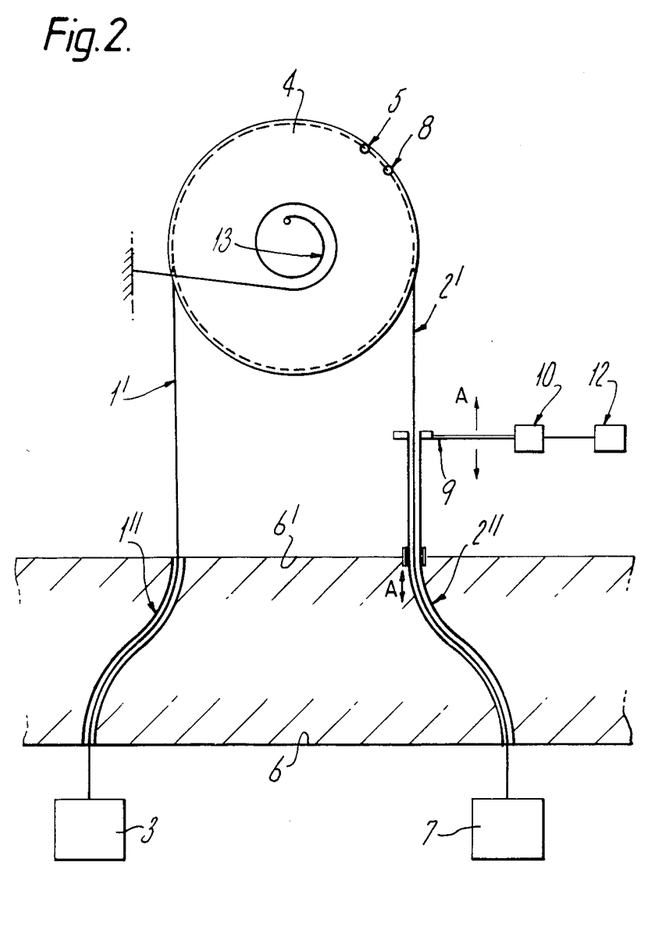

The device illustrated in FIGS. 1 and 2 comprises input cable 1 and output cable 2. Cables 1 and 2 consist of wires 1' and 2', respectively, which are partly enclosed by envelopes 1" and 2" respectively. Wires in connection herein mean flexible connection means, e.g., wires proper, threads, etc. Wire 1' of input cable 1 is secured at one end to accelerator pedal 3 and on the other to pulley 4 (point 5). Envelope 1" is secured at one end to chassis 6 of the car and on the other end to chassis 6' of the device. Wire 2' is secured on one end to carburettor 7 and on the other end to pulley 4 (point 8).

Envelope 2" is connected at one end to chassis 6 and is threaded through chassis 6' and secured to linearly movable carriage 9 which is driven by motor 10. Motor 10 is connected to electrical means 12 comprising the electrical actuating means, the reading means and pre-setting means (as hereinafter described in detail). Pulley 4 is pivoted into chassis 6' and is provided with circular spring 13. Spring 13 impedes the rotation of pulley 4. (Pulley 4 is supported by a bearing (not shown) and can be caused to rotate only by the action of accelerator 3).

One end of flexible metal strip 14 is wound around shaft 10' of motor 10. Strip 14 is wound on the other end around pulley 15 and secured to carriage 9.

The device illustrated in FIGS. 1 and 2 operates as follows:

When the speed of the vehicle is below the pre-set speed limit, electrical means 12 cause the motor to rotate clockwise thus winding metal strip 14 around shaft 10 and pulling carriage 9 to its extreme position detected by micro-switch 16. When microswitch 16 is activated and the direction instruction to motor 10 is clockwise the means 12 inhibits the motor drive, and carriage 9 remains in its extreme position.

Under these conditions carriage 9 exerts a balancing force on envelope 2" and any amount of stepping on the accelerator is transformed via wire 1', pulley 4 and wire 2' to carburettor 7. When the preset speed limit is reached motor 10 is instructed to rotate counterclockwise. The tension in envelope 2" pushes carriage 9 away from its extreme position thus keeping the tension in metal strip 14, and providing an extra length of wire 2' to carburettor 7 by the same amount of which carriage 9 is moved. Carburettor 7 is thus continuously shut off until equilibrium is reached. From this point on the vehicle is being driven at the preset speed limit with motor 10 alternating in both senses and carriage 9 moving to and fro.

According to road conditions, a situation may arise in which motor 10 is instructed to turn counter-clockwise more than required to shut carburettor 7 off completely. This is prevented by microswitch 17. When carburettor 7 is completely shut off the tension in metal strip 14 disappears and pulley holder 15' retracts away from microswitch 17 with the aid of spring 18. When microswitch 17 is deactivated and the direction instruction to motor 10 is counter-clockwise means 12 inhibits the motor drive.

Microswitch 11 provides a "kick-down" option; when accelerator pedal 3 is fully depressed microswitch 11 is activated, motor 10 rotates fully clockwise and full power of the engine is provided to the driver.

It is readily understood that "clockwise" and "counterclockwise" are indicated only for the sake of explanation and said directions may also be reversed.

Figure 3:
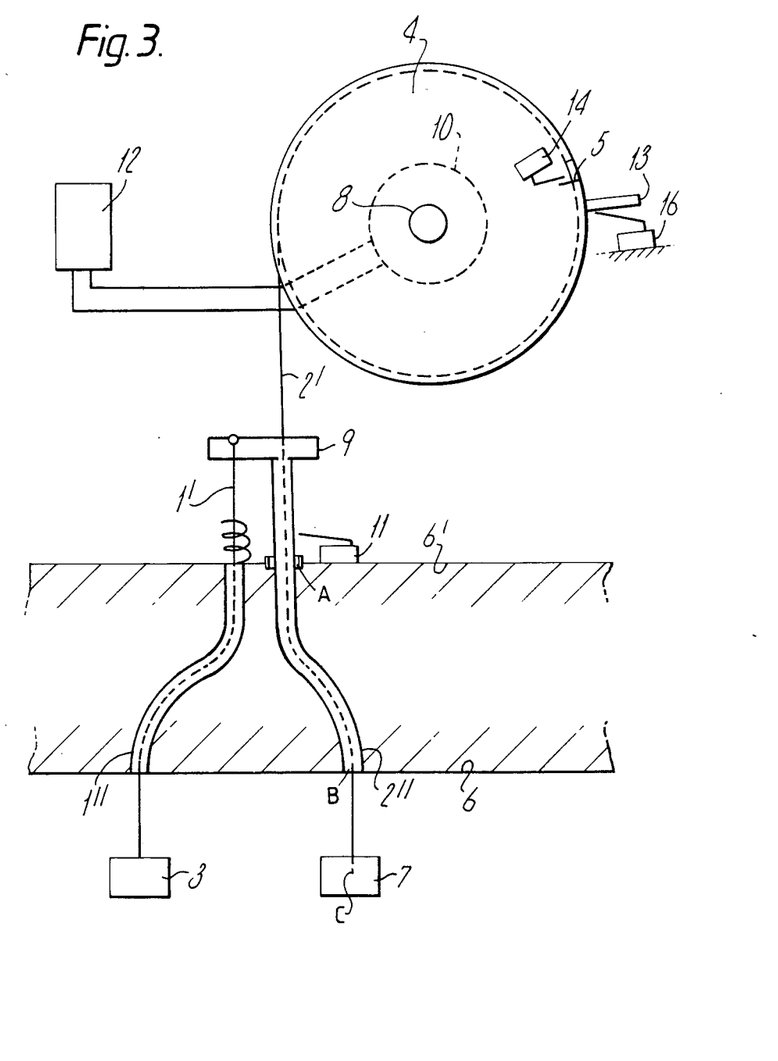

FIG. 3 shows schematically a variation of the device shown in FIG. 2 in which the rolls of the pulley and the carriage have been interchanged;

while in the embodiment shown in FIG. 2 the movable means is implemented by pulley 4 and the actuating means by movable carriage 9; in the embodiment shown in FIG. 3 the movable carriage 9 is the movable means and pulley 4 the actuating means.

In the embodiment shown in FIG. 3 wire 1' of the input cable 1 is secured at one end to the accelerator pedal 3 and on the other to linearly movable carriage 9. Envelope 1" is secured at one end to chassis 6 of the car and on the other end to chassis 6' of the device. Wire 2' is secured on one end to carburettor 7 and on the other end to pulley 4 (point 5). Envelope 2" is connected at one end to chassis 6 and is threaded through chassis 6' and secured to carriage 9. Pulley 4 is secured to a motor's shaft 8 via a suitable gear.

The device illustrated in FIG. 3 operates as follows:

When the speed of the vehicle is below the preset speed limit, electrical means 12 cause the motor to rotate clockwise thus rotating pulley 4 to its extreme position detected by lever 13 and microswitch 16.

Under these conditions stepping on the accelerator is transformed to carriage 9 via wire 1', which in turn pushes envelope 2" out of the device. The lengthening of segment AB of cable 2 between chassis 6 and 6' is compensated by the shortening of segment BC of wire 2'; thus any amount of stepping on the accelerator is transformed to carburettor 7.

When the preset speed limit is reached motor 10 is instructed to rotate counterclockwise. As the pulley rotates the shortening of wire 2' inside the device is compensated by lengthening of segment BC in carburettor 7 which is thus being continuously shut off until equilibrium is reached.

According to road conditions, a situation may arise in which motor 10 is instructed to turn counter-clockwise more than required to shut carburettor 7 off completely. This is prevented by microswitch 14; when carburettor 7 is completely shut off the tension in wire 2' disappears. The termination 5 of wire 2' releases microswitch 14 thus inhibiting further counter-clockwise rotating of the motor.

Figure 4:
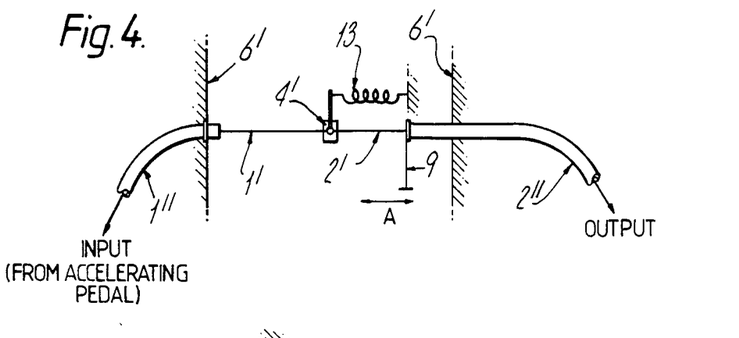
FIG. 4 shows in a schematical manner the mechanical arrangement of another embodiment of the device according to the present invention.

The embodiment illustrated in FIG. 4 is similar to that illustrated in FIGS. 1 and 2. The main difference is that in this embodiment envelopes 1" and 2" emanate from opposite sides of chassis 6'. Moreover, pulley 4 is replaced by hooker 4'. This embodiment thus operates in a manner similar to that illustrated in FIGS. 1 and 2.

Figure 5:
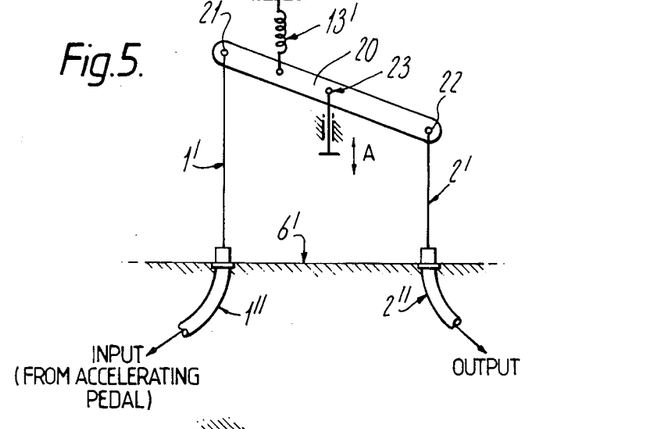
FIG. 5 shows in a schematical manner the mechanical arrangement of a further embodiment of the device according to the present invention.

In the embodiment illustrated in FIG. 5 envelope 2" is secured to chassis 6' and is not free to move. Wires 1' and 2' are secured to rod 20 at points 21 and 22, respectively. Rod 20 is pivoted at point 23. Point 23 is moved by motor 10 (not shown here) in the direction indicated by arrows A.

The device operates as follows:

When point 23 is in its upmost position, any amount of pulling of wire 1' is transferred directly to wire 2' and to the carburettor (not shown), point 23 being the axis of rotation of rod 20. When motor 10 moves point 23 downwards point 21 becomes the axis of rotation of rod 20 and point 22 moves downwards (twice the amount that point 23 does) thus allowing wire 2' to be pulled to a lesser extent than wire 1' is.

The operation of this embodiment and the results achieved are similar to that described for the embodiments illustrated in FIGS. 1 to 4, with the variations due to the different construction of said embodiment.

Figure 6:
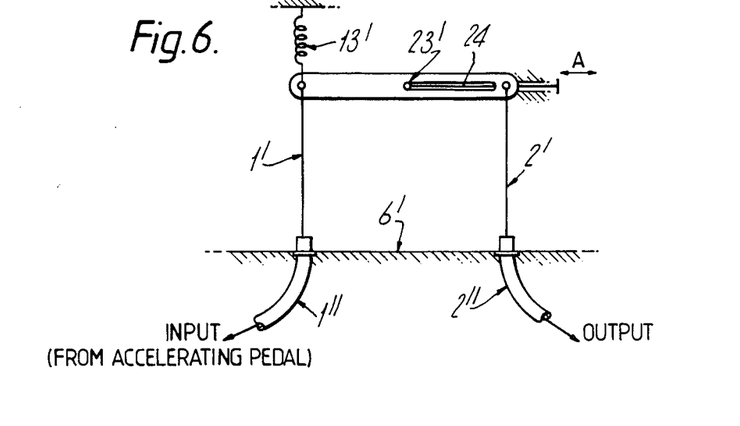
FIG. 6 shows in a schematical manner the mechanical arrangement of a further embodiment of the device according to the present invention.

In the device illustrated in FIG. 6 which is similar to that illustrated in FIG. 5, point 23' moves within groove 24.

In this embodiment point 23' as moved by motor 10, effectively multiplies the amount of pulling of wire 1' by a fraction between zero and one, and transfers the result to wire 21'.

When point 23' is in the middle of the rod 20 the multiplier equals one and any stepping on the accelerator pedal is transferred directly to the carburettor.

When point 23' moves to its rightmost position, the multiplier equals zero and the carburettor is completely shut off regardless of the stepping on the accelerator.

The operation of this embodiment and the results achieved are similar to that described for the embodiments illustrated in FIGS. 1 to 4, with the variations due to the different construction of said embodiment.

Some examples of electrical means 12 which may be utilized are exemplified in FIGS. 7-10.

Figure 7:
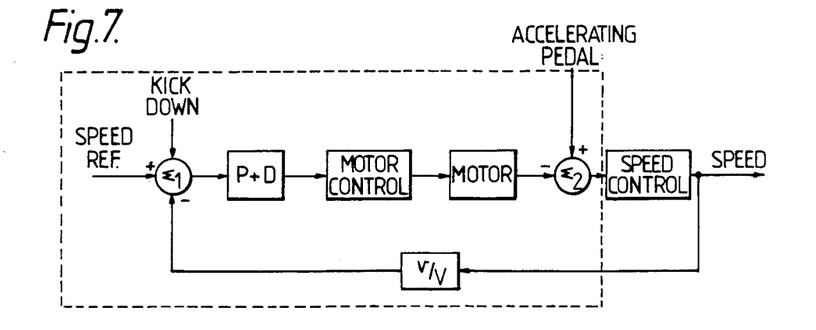
FIG. 7 shows a block diagram of electrical means of a device according to the present invention.
Figure 7A:
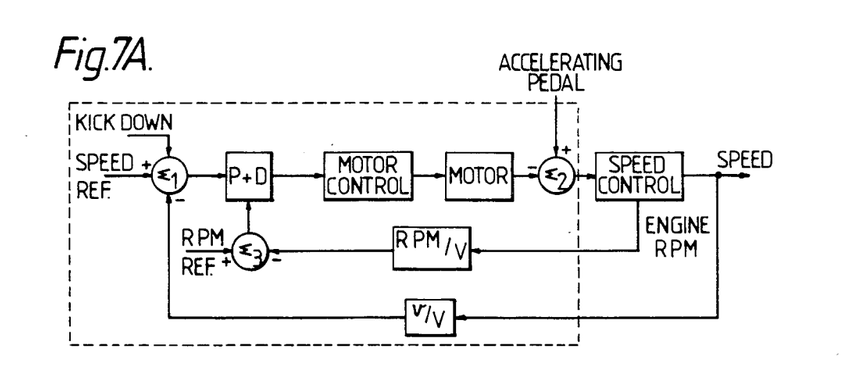
FIG. 7a shows a block diagram according to FIG. 7 comprising two reading means and two references.
Figure 9:
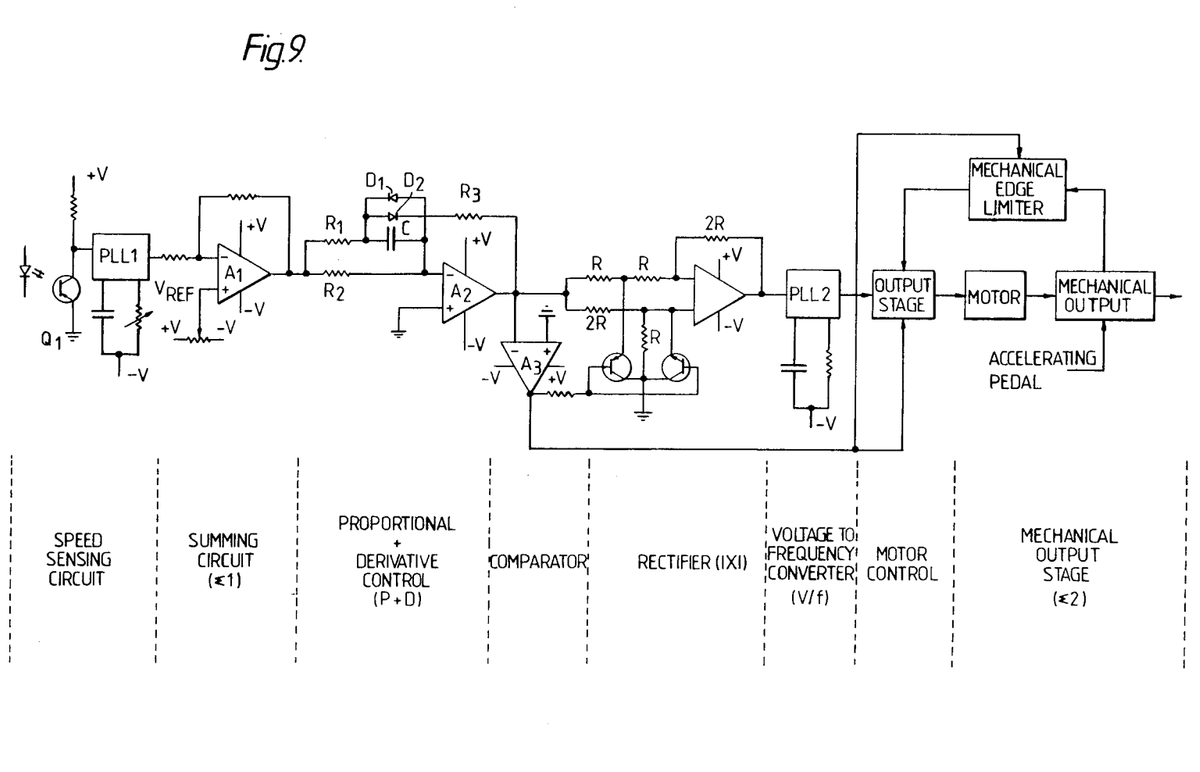
FIG. 9 shows an electronic diagram of the block diagram illustrated in FIG. 8.

The block diagram illustrated in FIG. 7 shows the following blocks (all specific elements are shown in FIG. 9):

a. Summing circuit $E_1$ which comprises operational amplifier A1 operated in the differential mode produces an error voltage in response to a reference voltage in its non-inverting input and a speed-proportional voltage in its inverting input.

b. Speed sensing circuit v/v. In said circuit a perforated disc is fitted on the speedometer cable which, when rotated cuts the light path of an optical interrupter. Phototransistor Q1 produces electronic pulses at a rate proportional to the speed of the vehicle. Phase-locked-loop PLL converts the pulses into a rate-proportional voltage. (In FIG. 7a are illustrated two blocks v/V and two references so that the device may be utilized simultaneously for controlling the speed limit and the engine RPM limit. The device will be activated by the limit of which is reached first).

c. Proportional and Derivative Control P+D. In said circuit the output of amplifier A2 is the sum of two input signals: the error voltage and its time rate of change. The addition of a derivative control C and $R_1$ (FIG. 9) counterbalances the integrating action of the electrical motor and thus helps to achieve a perfectly stable cruising action with no detectable oscillations. The proportional control is non-linear and its amplification depends on its input signal; when the input error voltage is greater than one Vd, the proportional signal amplification equals R3/R1 R2. When the input error voltage is less than one Vd, indicating a speed close to the preset speed limit, D1 and D2 are shut off. The proportional signal amplification is now much smaller being equal to R3/R2, and the derivative control dominates while the system is cruising the vehicle.

d. Motor Control (output stage). Said control is specific to the type of the motor utilized, e.g., for one electrical motor a power amplifier is used; for a piston an electrical switching mechanism of valves is used, etc.

The motor stands for motor 10, $E_2$ stands for the mechanical output stage, i.e., the output movement to carburettor 7 resulting from the operation of accelerator 3 and of the device according to the present invention.

Figure 8:
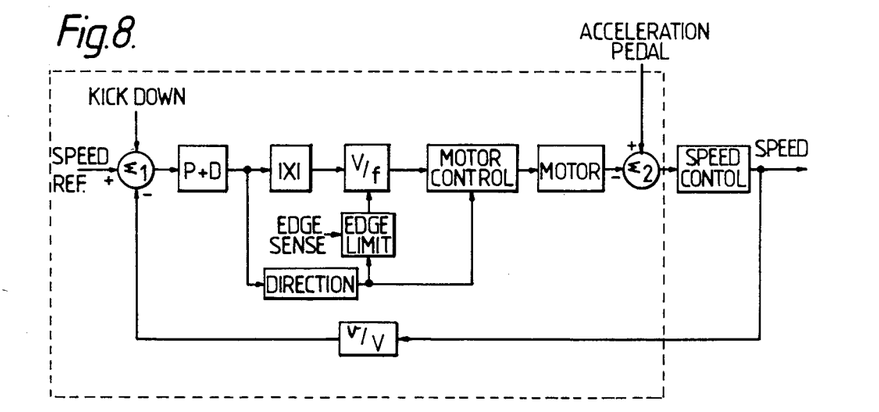
FIG. 8 shows a more detailed block diagram shown in FIG. 7.
Figure 10:
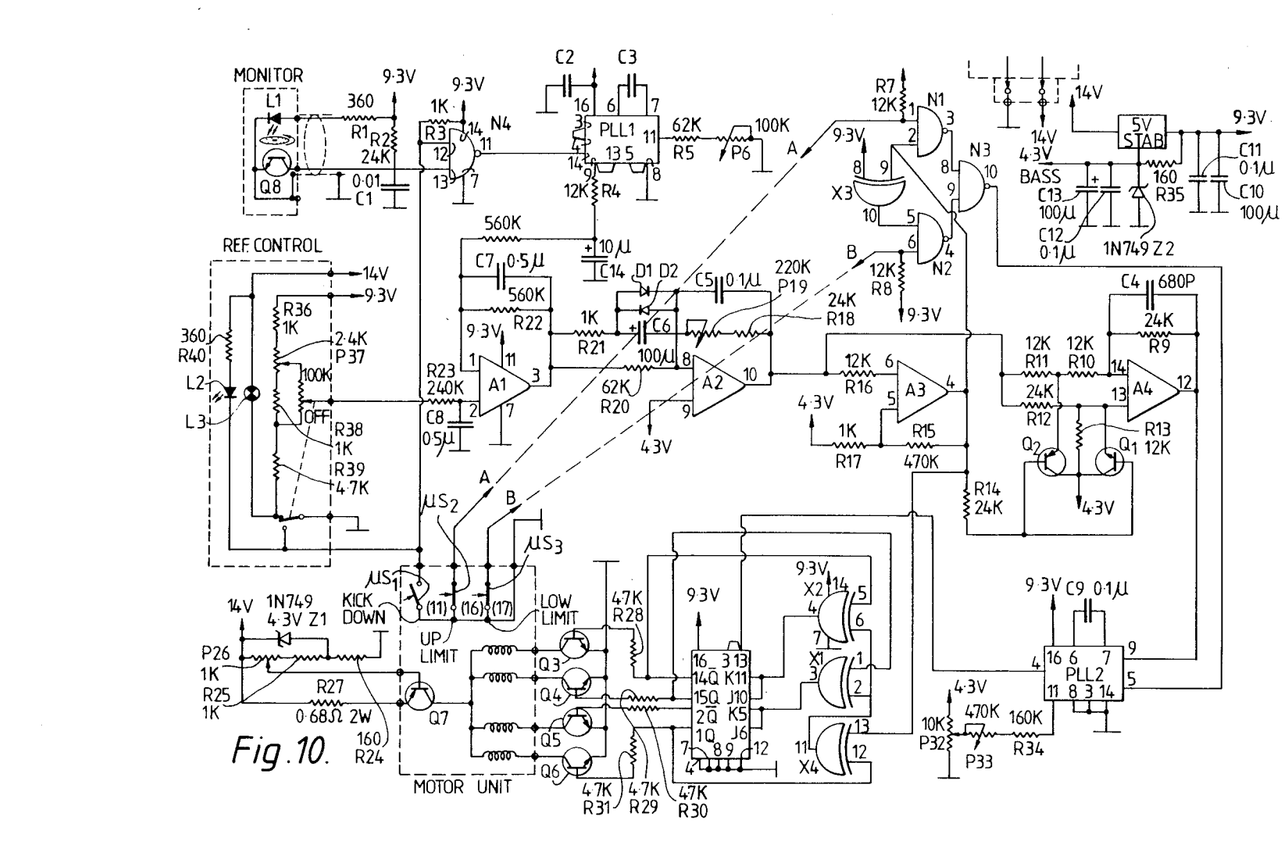
FIG. 10 shows an electronic circuit of the electrical arrangement illustrated in FIGS. 8 and 9.

The embodiment illustrated in FIGS. 8–10 utilized a stepping motor. Thus it comprises some additional circuits in addition to those illustrated in the block diagram of FIG. 7. Said additional circuits are:

a. Comparator (direction): in said circuit a comparator A3 determines the sign of the error voltage and controls the sense of the motor rotation.

f. Rectifier (/x/). In said circuit active rectifier A4 produces an absolute value signal of its input voltage to control the speed of the motor rotation in both senses.

g. Voltage to frequency converter (V/f). Said circuit PLL2 supplies pulses at a rate proportional to its input voltage for driving a stepping motor. The pulses from said circuit and from comparator A3 are applied to the output stage which switches the phases of the stepping motor.

h. Edge limit is described in FIGS. 1 and 2.

An electronic diagram and a detailed electric circuit diagram of the embodiment illustrated in the block diagram of FIG. 8 are shown in FIGS. 9 and 10 respectively.

The circuits being part of the embodiment illustrated in FIG. 7 are substantially identical to the circuits appearing also in the embodiment exemplified in FIGS. 8–10.

Figure 11:
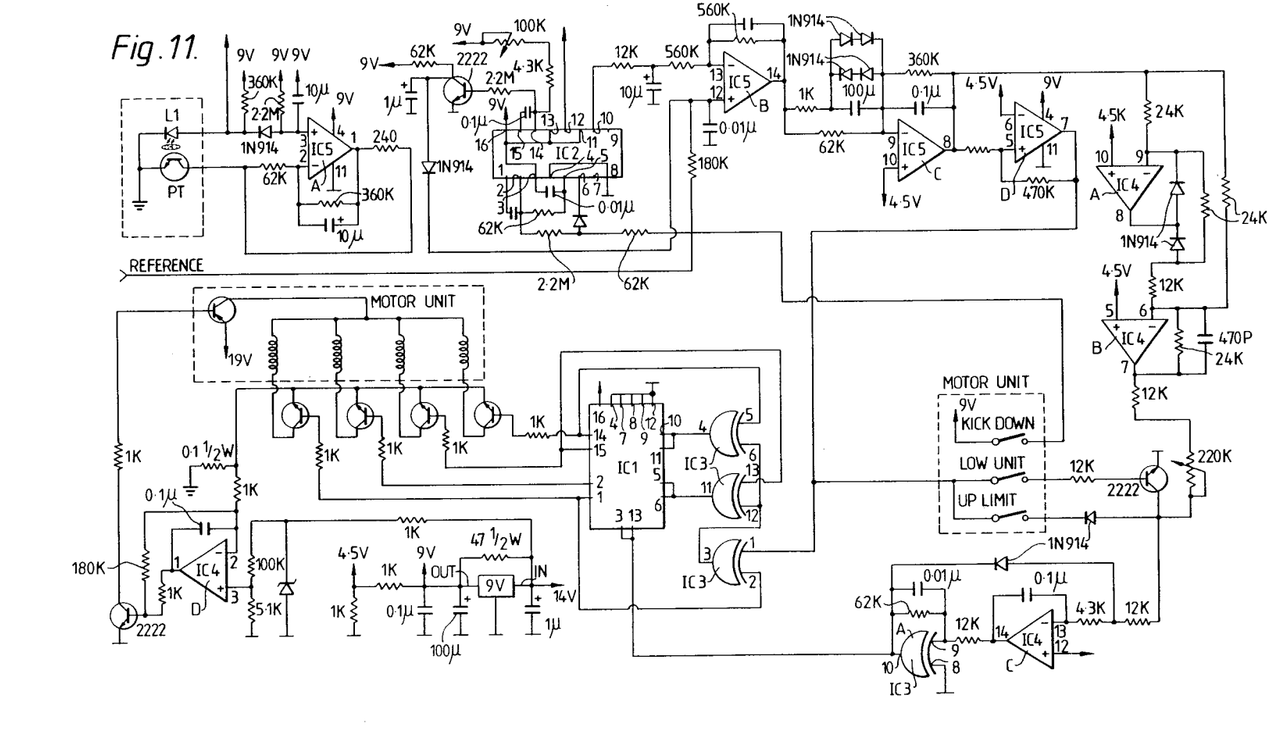
FIG. 11 shows a further electronic circuit of the electrical arrangement illustrated in FIGS. 8 and 9.

FIG. 11 shows a detailed description of a variation of the electrical circuitry shown in FIG. 10.

The variations of various blocks implementation are as follows:

b. A constant-pulse-length-variable-frequency single-shot IC2 converts input pulses from phototransistor PT into a rate-proportional voltage.

f. Rectifier 1X1 comprises a dual amplifier absolute-value-circuit IC4A & IC4B.

g. Voltage to frequency converter V/f is a Voltage-Controlled-Oscillator made of an integrator IC4C and comparator IC3A.

h. Edge-limit: Up-limit and Low-limit microswitches, in accordance with Direction instruction, inhibit voltage to frequency converter V/f.

i. IC5A controls the amount of light emitted by infrared diode L1.

The electrical means illustrated in FIGS. 7–11 may be utilized together with any of the mechanical embodiments illustrated in FIGS. 1–6.

We claim:

1. A device ascertaining that a vehicle having an accelerator does not exceed a pre-set speed limit comprising:
   a. first means for transferring the input movement from the accelerator to
   b. pulley means for controlling the output movement of the accelerator;
   c. second means for transferring said output movement to a speed control unit;
   d. electrical means actuating said pulley means the moment the pre-set speed limit is reached;
   e. means for pre-setting the desired speed limit;
   f. wherein said first transferring means is an input cable secured to the accelerator at one end and to said pully means at the other end, and said second transferring means is an output cable cable secured to the speed control unit at one end and to said pulley means at the other end; and
   g. wherein each cable is disposed within a corresponding envelope, and wherein one end of each envelope of the input and output cables is secured to the chassis of the vehicle, the other end of the envelope of the input cable is connected to the chassis of the device, and the other end of the envelope of the output cable is threaded through the chassis of the device and secured to a linearly moving carriage.

2. A device according to claim 1 wherein the means for pre-setting the speed limit is a potentiometer.

3. A device ascertaining that a vehicle having an accelerator does not exceed a pre-set speed limit comprising:
   a. first means for transferring the input movement from the accelerator to
   b. pulley means for controlling the output movement of the accelerator;
   c. second means for transferring said output movement to a speed control unit;
   d. electrical means actuating said pulley means the moment the pre-set speed limit is reached;
   e. means for pre-setting the desired speed limit;
   f. wherein said first transferring means is an input cable secured to the accelerator at one end and to said pulley means at the other end, and said second transferring means is an output cable cable secured to the speed control unit at one end and to said pulley means at the other end; and
   g. wherein the means for pre-setting the speed limit is a potentiometer.

* * * * *